(12) United States Patent
Daas et al.

(10) Patent No.: US 8,887,439 B2
(45) Date of Patent: Nov. 18, 2014

(54) METHOD FOR CULTIVATING ONE OR MORE PLANTS

(75) Inventors: Kamal Daas, Bergschenhoek (NL); Talal Daas, Naperville, IL (US); Peter Van Der Drift, Bleiswijk (NL)

(73) Assignee: Horticoop B.V. (NL)

( * ) Notice: Subject to any disclaimer, the term of this patent is extended or adjusted under 35 U.S.C. 154(b) by 55 days.

(21) Appl. No.: 13/288,134

(22) Filed: Nov. 3, 2011

(65) Prior Publication Data

US 2012/0186151 A1    Jul. 26, 2012

(30) Foreign Application Priority Data

Nov. 3, 2010  (DE) .......................... 10 2010 050 367

(51) Int. Cl.
*A01G 9/02* (2006.01)
*A01G 31/02* (2006.01)

(52) U.S. Cl.
CPC ................ *A01G 31/02* (2013.01); *A01G 9/028* (2013.01)
USPC ................... 47/66.7; 47/60; 47/85; 47/58.1 R

(58) Field of Classification Search
USPC ........ 47/60, 62 R, 62 C, 62 N, 65.5, 66.7, 85, 47/86, 87, 58.1 R, 63
See application file for complete search history.

(56) References Cited

U.S. PATENT DOCUMENTS

| | | | | |
|---|---|---|---|---|
| 1,491,926 | A * | 4/1924 | Rosenwald | 47/41.11 |
| 4,034,506 | A * | 7/1977 | Kasahara et al. | 47/64 |
| 4,310,990 | A * | 1/1982 | Payne | 47/59 R |
| 4,382,348 | A * | 5/1983 | Kitsu et al. | 47/59 R |
| 4,926,584 | A * | 5/1990 | Horibata | 47/59 R |
| 6,088,958 | A * | 7/2000 | Oka et al. | 47/58.1 R |
| 6,219,966 | B1 * | 4/2001 | Lapointe et al. | 47/62 C |
| 2013/0160362 | A1 * | 6/2013 | Daas et al. | 47/59 S |

FOREIGN PATENT DOCUMENTS

| | | |
|---|---|---|
| EP | 0 937 386 A1 | 8/1999 |
| WO | WO 95/11587 A1 | 5/1995 |
| WO | WO 98/14051 A1 | 4/1998 |

OTHER PUBLICATIONS

International Search Report corresponding to International Application No. PCT/EP2011/04697, dated Feb. 2, 2012; 4 total pages, including translation.
English translation of the Written Opinion of the International Searching Authority, dated Feb. 2, 2012; 6 pages.
English translation of the International Preliminary Report on Patentability (Chapter I), dated May 8, 2013; 1 page.

* cited by examiner

*Primary Examiner* — Rob Swiatek
*Assistant Examiner* — Lisa Tsang
(74) *Attorney, Agent, or Firm* — Carter, DeLuca, Farrell & Schmidt, LLP

(57) ABSTRACT

A method for cultivating one or more plants in an apparatus which has at least one first chamber and at least one second chamber which are separated from one another by a first partition wall, wherein the first partition wall has one or more communication openings which connect the inner space of the first chamber to the inner space of the second chamber, wherein the method includes the step that the plant and/or the first partition wall are displaced so that an area of the plant which was initially located in the second chamber is located in the first chamber after the displacement of the plant and/or of the first partition wall, and/or wherein the method includes the step that the plant is offset relative to the apparatus such that a region of the plant which was initially not located in the second chamber is located in the second chamber after the displacement of the plant relative to the apparatus.

16 Claims, 4 Drawing Sheets

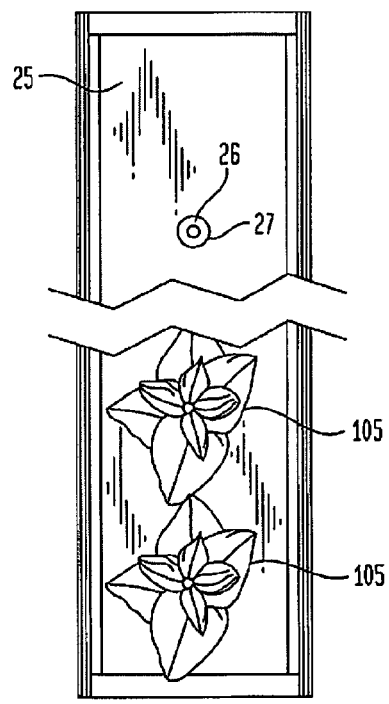
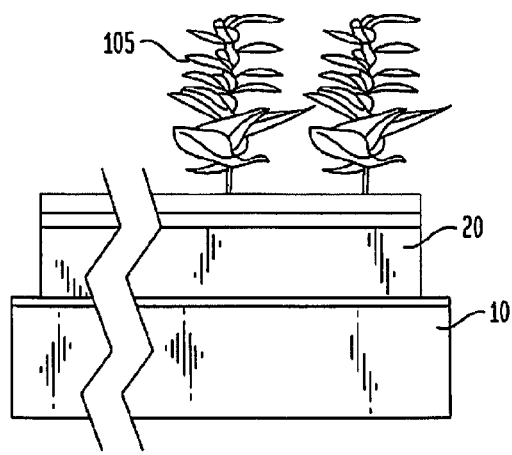
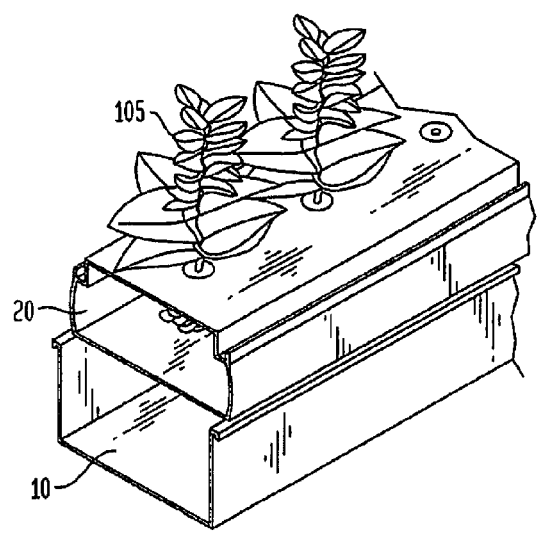

METHOD FOR CULTIVATING ONE OR MORE PLANTS

This application claims priority to German Patent Application No. 10 2010 050 367.3, filed Nov. 3, 2010, the entire contents of which are hereby incorporated by reference.

The present invention relates to a method for cultivating one or more plants.

Methods for the commercial cultivation of plants are known in a large number of different embodiments from the prior art.

It is the underlying object of the present invention to provide an improved method for cultivating plants and in particular crop-carrying agricultural plants. As used herein, "crop" refers to the produce of cultivated plants, e.g., cereals, vegetables, fruits, tubers, and other harvestable portions thereof.

This object is achieved by a method having the features of claim 1.

Provision is accordingly made that the method is carried out by means of a first apparatus which has at least one first chamber and at least one second chamber which are separated from one another by a first partition wall, wherein the first partition wall has one or more communication openings which connect the inner space of the first chamber with the inner space of the second chamber. Provision is made in accordance with the invention that the method includes the step that the plant and/or the first partition wall is displaced such that an area of the plant which was initially in the second chamber is located in the first chamber after the displacement of the plant and/or of the first partition wall. Provision can be made alternatively or additionally to this that the method includes the step of offsetting the plant relative to the apparatus in that the plant is displaced relative to the apparatus such that an area of the plant which was initially not located in the second chamber is located in the second chamber after the displacement of the plant. This can be achieved, for example, in that the plant is moved or in that one or more walls of the apparatus are moved such that the desired displacement of the area takes place.

The term "relative movement" between the plant and the apparatus is to be understood such that either the plant is moved and the apparatus or parts of the apparatus such as one or more partition walls or the like are moved. However, the case is also covered under the term that the apparatus or its parts remain in a fixed position and the plant is moved in the apparatus. Both are also possible, that is both a change in the position of the plant and a change in the position of at least one part of the apparatus such as a partition wall.

Provision is thus made in accordance with the invention that a relative movement takes place between the plant and the apparatus or a part of the apparatus. This has the advantage that a further area of the plant can be displaced into the second chamber or can arise therein and that the area of the plant which was originally, that is before the displacement, in the second chamber can serve as or form, for example, a root area.

It is thus conceivable, for example, that the area of the plant which was located in the second chamber before the displacement is located in the first chamber after the displacement and forms roots there.

It is equally conceivable that an area which was not located in the second chamber before the displacement is located in the second chamber after the displacement and forms crop there. It is possible by the method in accordance with the invention to improve the yield of a plant since the plant can be picked more than once in a specific period of time.

It is thus conceivable, for example, that the picking of crop takes place before the displacement of the plant and/or of the first partition wall or of another part of the apparatus from an area of the plant which is located in the second chamber before the displacement of the plant and/or of the first partition wall and/or that the picking of crop takes place after the displacement of the plant and/or of the first partition wall or the like from an area of the plant which is located in the second chamber after the displacement of the plant and/or of the first partition wall.

This process of displacement can naturally also be carried out more than once, that is the displacement of the plant and/or of the partition wall does not have to be a single process, but can rather take place repeatedly in order to be able to pick crop from the named second chamber over and over again.

Provision is made in a further embodiment of the invention that the first chamber is also located at least above the second chamber and that the first partition wall is displaced upwardly such that an area of the plant which was initially, that is before the displacement, located in the second chamber, is located in the first chamber after the displacement of the plant and/or of the first partition wall. It is thus conceivable that the first partition wall is designed to be movable.

A displacement of the plant in the apparatus can also be carried out alternatively or additionally for moving this first partition wall, as was described above.

It is furthermore conceivable that the second chamber likewise has a partition wall which bounds or terminates the second chamber. In an embodiment, the volume of the first chamber and/or of the second chamber is changeable provided that this is of advantage for the cultivation of the plant. This change can take place, for example, by a change in the spacing between the first partition wall and the second partition wall and/or by a change in the position of the first partition wall and/or the second partition wall and/or the change in the position of one or more lateral walls of the first chamber and/or of the second chamber.

The named partition walls preferably form the upper and/or the lower boundary of the respective chambers.

It is conceivable that only the named secondary partition plate is moved, while the first partition plate remains stationary. It is, however, also conceivable within the framework of the invention that the first partition plate is moved, while the second partition plate remains stationary or that both partition plates are moved.

It is conceivable to be able to adjust the volume of the first chamber and/or of the second chamber or the spacing of the partition walls from one another in defined steps or continuously.

Provided a change in the volume of the second chamber occurs, it is conceivable that this volume change takes place by the plant itself. On the growth of the plant or of the crop, the second partition plate can be raised upwardly and/or the first partition plate is pressed downwardly and/or one or both side walls can be moved outwardly. This is possible on the user side, on the one hand. Provision can alternatively or additionally be made for this purpose that the volume change is produced by the plant itself.

Provision is made in a further embodiment of the invention that the second chamber has one or more openings which are arranged in a second partition wall and through which a part of the plant extends and that the position of the second partition wall is not changed on the displacement of the plant and/or of the first partition wall. It is therefore conceivable that the second partition wall remains stationary in position when the plant and/or the first partition wall are displaced.

Alternatively to this, it is conceivable that the position of the second partition wall is also changed on the displacement of the plant and/or of the first partition wall.

On these position changes, it is conceivable that the volumes of the first chamber and/or of the second chamber remain the same or are also changed. It is thus possible that, for example, the second chamber has a comparatively large volume before the displacement of the plant or of the first partition wall or, for example, of the second partition wall by taking up the crop and that the second chamber is smaller after the displacement of the plant or of the partition wall than before the displacement of the plant or of the first partition wall. It is furthermore conceivable that the volume of the second chamber is then increased—either on the user side or by the plant itself—provided this is favorable for an ideal yield.

However, the case is also covered by the invention that the volumes of the first chamber and of the second chamber remain identical before and after the displacement of the plant or of the first partition wall or the like.

Provision is made in a further embodiment of the invention that the plant is arranged in the apparatus before the displacement of the plant and/or of the first partition wall or the like such that roots are located in the first chamber and an area of the plant is located in the second chamber in which the crop grows or is present.

Provision is made in a further embodiment of the invention that the second chamber has one or more openings which are arranged in a second partition wall and through which a part of the plant in the form of a stem or the like extends, with the plant being arranged in the apparatus such that leaves of the plant, at least also at the stem, are located in an area outside the second chamber. It is conceivable that this area of the plant, which is located outside the first chamber and the second chamber, is arranged in the environmental atmosphere or also in a third chamber which adjoins the second chamber. This third chamber can, for example, be bounded by a transparent plate so that light is incident onto the leaves of the plant.

Provision is made in a further embodiment of the invention that a culture medium and/or another substrate and/or water is presented in the first chamber and/or that air or humidified air is presented in the second chamber.

The culture medium or the substrate or water serves to provide an adequate medium to the roots to enable a suitable growth of the plant. It is conceivable that the first partition wall which separates the first chamber from the second chamber lies on this culture medium or substrate or water or is also spaced apart therefrom. This culture medium or substrate or water can be present in stationary form or can also flow through the first chamber or can be moved through the first chamber in a suitable manner.

The humidification of the air in the second chamber can be carried out, for example, by one or more nozzles or the like by which moisture or humidified air is introduced into the second chamber provided that this is advantageous for the growth process of the plant.

It is conceivable that at least one side wall of the second chamber, preferably the left side wall and/or the right side wall of the second chamber in the longitudinal direction, and optionally all walls of the second chamber, are flexible or elastic, at least at the connection lines to the first and/or second partition walls. In an embodiment, at least one side wall of the second chamber, preferably the left and/or right side walls of the second chamber, and optionally all four side walls of the second chamber, are made from stiff parts which can, however, be folded or pulled out. It is also conceivable to form the at least one side wall of the second chamber, preferably the front and rear side walls of the second chamber, and optionally, all four side walls of the second chamber, as rigid, with the first and the second partition walls being displaceably arranged along the respective side wall.

The second chamber thereby always remains closed despite any adjustment of the volume.

The walls of the first chamber can be made as rigid so that a volume change of the first chamber is only conceivable by a relative movement of the first partition wall relative to the first chamber. It is also possible to design one or more walls of the first chamber as flexible or elastic so that a volume change can likewise be realized by these walls.

Provision is made in a further embodiment of the invention that a displacement of the plant and/or of the first partition wall or the like only takes place when one or more roots and/or stolons and/or sprouts have formed in the area of the plant which is located in the second chamber before the displacement. Stolons are shoots of plants which can exist as independent plant parts when they are separated from the mother plants.

It is thus conceivable first to wait for the formation of roots, sprouts or of the named stolons which form in the second area and only then to perform a displacement of the plant such that this area of the plant which bears the roots, stolons or sprout is displaced into the first area, either by a displacement of the plant itself and/or by a displacement of the first partition wall which separates the two chambers from one another. It is thus possible to use an area of the plant in which initially the crop has grown as the area in which the roots form. The crop will then arise in another area of the plant. Provided that stolons have formed, it is conceivable to leave them in the second chamber.

Provision is made in a further embodiment of the invention that a pivoting, displacement or removal of at least one boundary surface of the second chamber takes place at least section-wise for the picking of the crop from the second chamber and/or that two oppositely disposed side walls are pivoted and/or displaced and/or removed at least section-wise and a plate or a shovel or the like is driven from a side through the second chamber and in so doing the crop is pressed out of the other side.

Further details and advantages of the present invention will be explained in more detail with reference to an embodiment shown in the drawing. There are shown:

FIG. 1: a schematic cross-sectional view through an apparatus for carrying out the method in accordance with the invention with a plant inserted therein;

FIG. 2: a plan view of the arrangement in accordance with FIG. 1;

FIG. 3: a side view of the arrangement in accordance with FIG. 4;

FIG. 4: a perspective view of the arrangement in accordance with FIG. 1;

FIG. 5: a schematic cross-sectional view through an apparatus for carrying out the method in accordance with the invention in a further embodiment;

FIG. 6: a plan view of the arrangement in accordance with FIG. 5;

FIG. 7: a side view of the arrangement in accordance with FIG. 5; and

FIG. 8: a perspective view of the arrangement in accordance with FIG. 5.

FIG. 9: a schematic cross-sectional view through an apparatus in accordance with FIG. 1 illustrating, inter alia, open or displaced side walls.

FIG. 10: a schematic cross-sectional view through an apparatus in accordance with FIG. 1 illustrating, inter alia, and an area of the plant which was formerly in the second chamber now located in the second chamber.

An apparatus for carrying out the method in accordance with the invention is shown in FIG. 1 in a schematic cross-sectional view.

As can be seen from FIG. 1, the apparatus comprises a first chamber 10 and a second chamber 20 arranged thereabove. A first partition wall 15 is located between the first chamber 10 and the second chamber 20. A second partition wall 25 is located above the second chamber 20.

The first chamber 10 is bounded by a partition wall 15 as a top surface and by side walls, by a boundary surface at the front and by a boundary surface at the rear as well as by a base surface 10a. The first chamber 10 is fully circumferentially bounded by stable walls. These walls can be produced, for example, from a metal or also from a plastic material.

The second chamber 20 is defined by the second partition wall 25 as a top surface, by the first partition wall 15 as a base, by the side boundary surfaces 22, 23 as well as by a front boundary surface and a rear boundary surface.

A plurality of communication openings 16 which connect the inner spaces of the first chamber 10 and of the second chamber 20 to one another are located within the first partition wall 15. A part of the plant 100 between the roots 103 and the crop 102 extends through these openings 16.

A plurality of openings 26 are located in the second partition wall 25, with provision preferably being made that the openings 16, 26 are aligned with one another and/or the number of openings 16 corresponds to that of the openings 26.

As can further be seen from FIG. 1, means 17 for fixing a seed or a seedling are attached to the communication openings 16 of the first partition wall 15. Means 27 which guide the sprout axis of the plant 100 are also attached to the outlet openings 26.

The apparatus shown in FIG. 1 can have an inflow line and/or an outflow line. Water or a nutrient solution can be introduced into the first chamber 10 thereby. Consumed water or consumed nutrient solution leaves the first chamber 42 through the outflow line 42.

Provision is preferably made that the first chamber is filled with a substrate, for example with an inorganic substrate such as grainy, granulated expanded clay. The use of soil or the like as a substrate is also conceivable.

As can further be seen from FIG. 1, the root area 103 of the plant 100 is located in the first chamber 10. The plant 100 furthermore has a further area 101 in which the crop 102 is located. This area 101 is located within the second chamber 20. The area of the plant 100 in which the leaves 105 are arranged is located above the second chamber 20. A region of the stem 104 extends through the openings 26 of the second partition wall and the leaves 105 are located above it outside the second chamber 20 and the crop 102 is located below it within the second chamber 20.

The shown walls 22, 23 of the second chamber can be designed such that they are elastic and/or flexible or movable so that the volume of the second chamber 20 can be changed.

Provision can furthermore be made that the position of the first partition wall 15 is changeable, and indeed in accordance with FIG. 1 such that the first partition wall 15 can be displaced downwardly or upwardly.

In the course of cultivation, a germinable plant part is attached to a fixing means 17 in the region of one of the communication openings 16 of the first partition wall 15. In this phase, the second partition wall 25 is located, for example, very close to the first partition wall 15 so that the funnel-shaped means for guiding the sprout axis 27 practically contact the communication openings 16. This is not absolutely necessary. It is also possible to make available a comparatively large space of the second chamber 20 or a spacing of the partition walls 15, 25.

When the plant 100 has reached a specific size and the leaves 105 have a sufficient overhang over the second partition wall 25, the second partition wall 25 can be raised and thus the volume of the second chamber 20 and thus also the spacing from the first partition wall 15 can be increased. This can be done by the plant itself or by the user.

In this stage, a section along the sprout axis is thus located in the second chamber 20 which is separated by the partition walls 15, 25 both from the roots 103 and from the leaves 105. The crop 102 is located in this area in the second chamber 20. As stated above, the climate and the air humidity within the second chamber 20 is influenced by the sprinkler system 45 to ensure an ideal growth of the crop 102.

Once the crop 102 is present in a state suitable for picking, it is removed from the second chamber 20, for example manually or by a machine, by opening one or both side walls 22, 23 via joints 50, 52, 54, and/or 56.

Subsequently, the plant and/or the first partition wall 15 is/are displaced so that the area which is located in the second chamber 20 in accordance with FIG. 1 is now partly or fully in the first chamber 10. In other words, the region marked by the reference numeral 101 in FIG. 1 is displaced partly or fully so that it is located beneath the partition wall 15 after the displacement. See, e.g., FIG. 10.

This region is thus used to form the roots in a second phase, whereas a region located thereabove, for example the area which extends through the opening 26 in accordance with FIG. 1 is used to form the crop. It is also conceivable that stolons 106 have already formed in the region 101 in the growth phase in accordance with FIG. 1, said stolons remaining in the second chamber 20 after the displacement of the plant and producing crop again there. It is possible in this manner to pick the plant not only in one region, but rather in a plurality of regions, which results in a crop yield per time unit improved overall.

FIG. 2 shows the arrangement in accordance with FIG. 1 in a plan view with openings 26 of the upper partition wall, that is of the second partition wall 25.

FIGS. 3 and 4 show the arrangement in accordance with FIG. 1 in a side view and in a perspective view. It can be seen from these Figures that the chambers 10, 20 are formed as elongated passages in which the plants 100 are arranged next to one another.

The second chamber 20 does not necessarily only have to be located above the first chamber 10, as can be seen from FIG. 1. It is also conceivable that the second chamber 20 also extends in a region next to the first chamber, as can be seen from FIG. 5. In this embodiment, the first chamber 10 is separated on its upper side and in its two side regions, directly or by a gap, from the second chamber 20.

In the embodiment shown in FIG. 5, it is indicated that both the first partition wall 15 and the second partition wall 25 are movable so that, on the one hand, a volume change is possible and, on the other hand, the desired displacement of the plant relative to the partition wall 15. This can likewise be the case in the embodiment in accordance with the FIGS. 1-4.

A line is also designated by the reference numeral 45 in FIG. 5 by means of which a suitable atmosphere or humidity can be provided in the second chamber 20.

Figure 1:
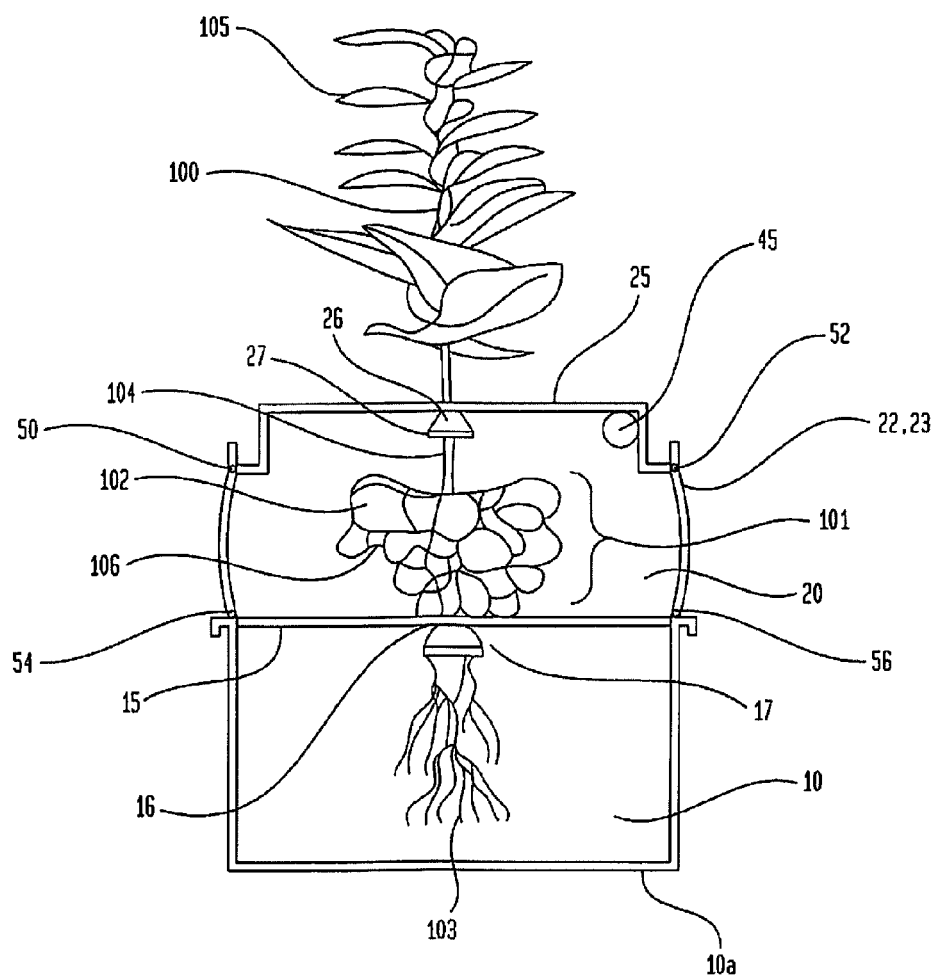
Figure 5:
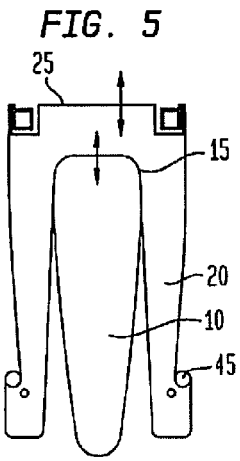
Figure 7:
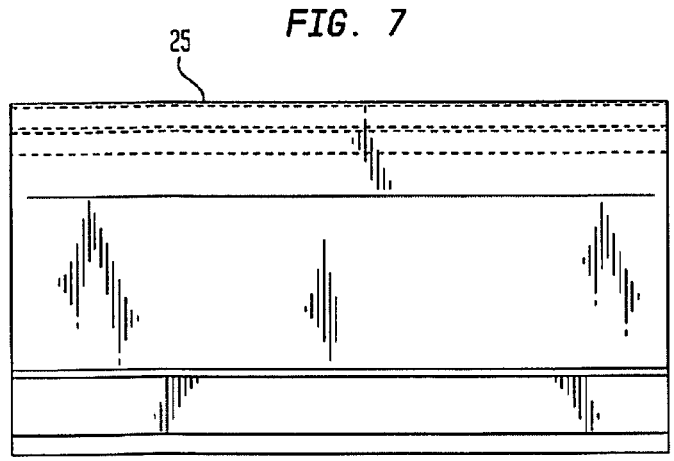
FIG. 7 shows the arrangement in accordance with FIG. 5 in a side view.
Figure 6:
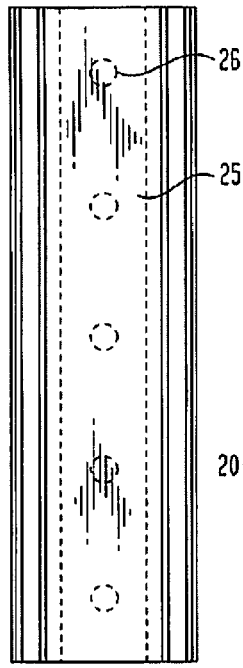
FIG. 6 shows the arrangement in accordance with FIG. 5 in a plan view with openings 26 through which a section of the stem of the plant 100 extends.
Figure 8:
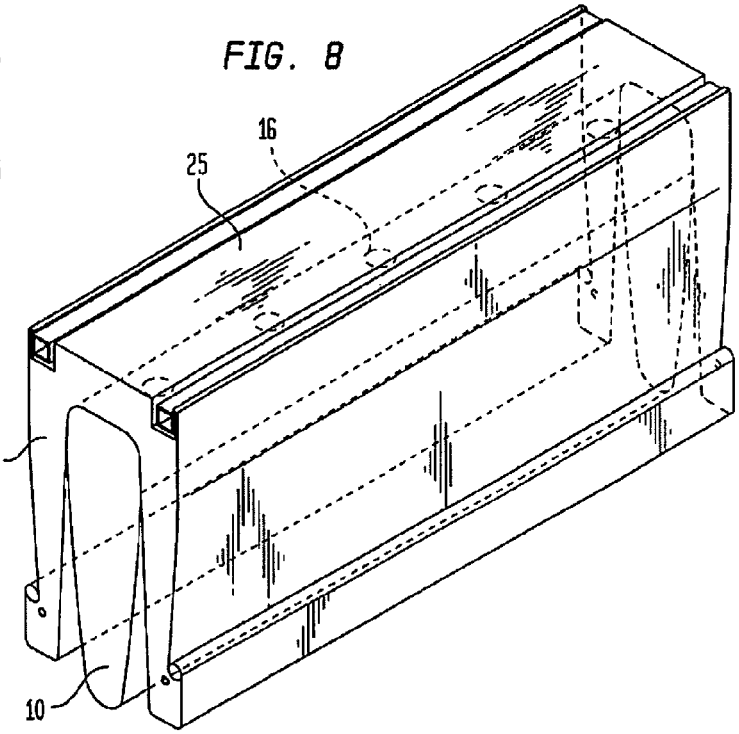
Figure 9:
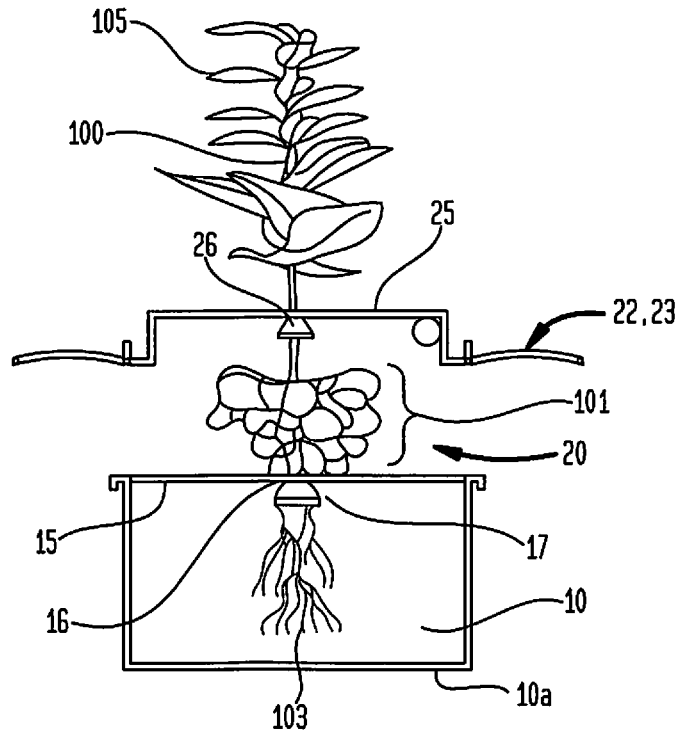
Figure 10:
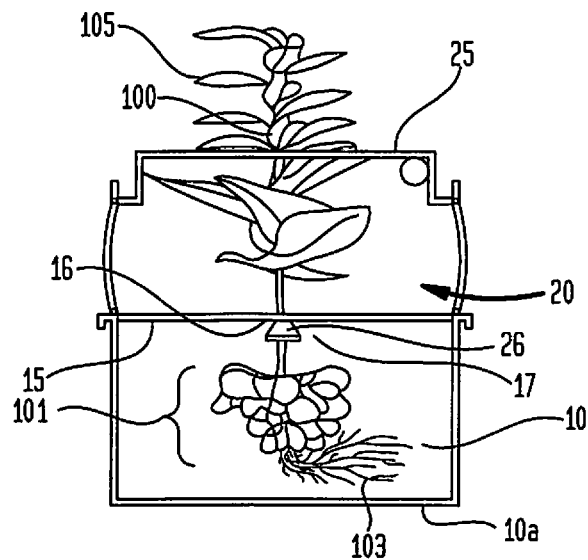

FIG. 8 in a perspective representation.

The invention claimed is:

1. A method for cultivating one or more plants which comprises:
providing an apparatus which includes a first chamber and a second chamber which are separated from one another by a first partition wall, wherein the first partition wall has one or more communication openings which connect the first chamber to the second chamber, wherein the apparatus at least partially contains a plant which extends from the first chamber through the first partition wall into the second chamber; and
displacing
(i) the plant,
(ii) the first partition wall, or
(iii) the plant and the first partition wall,
so that an area of the plant which was initially located above the first partition wall is located below the first partition wall after said displacing.

2. The method in accordance with claim 1, further comprising picking a crop from the plant before said displacing, the crop being located in the second chamber.

3. The method in accordance with claim 1 wherein the first chamber is located partially or totally above the second chamber; and the first partition wall is displaced upwardly so that the area of the plant which was initially located in the second chamber is located in the first chamber after said displacing.

4. The method in accordance claim 1, wherein the second chamber has one or more openings which are arranged in a second partition wall and through which a part of the plant extends; and the position of the second partition wall is not changed during said displacing.

5. The method in accordance with claim 1, wherein the plant is arranged in the apparatus before said displacing such that roots of the plant are located in the first chamber and the area of the plant in the second chamber includes a crop.

6. The method in accordance with claim 1, wherein the plant includes a stem having leaves attached thereto, and the second chamber has one or more openings which are arranged in a second partition wall and through which a part of the plant extends, the plant being arranged in the apparatus such that at least some of the leaves of the plant are located in an area outside the second chamber.

7. The method in accordance with claim 1, wherein a culture medium, substrate, water, or combinations thereof are presented into the first chamber.

8. The method in accordance with claim 1, wherein said displacing takes place when one or more roots, stolons, sprouts, or combinations thereof have formed in the area of the plant which is located in the second chamber before said displacing.

9. The method in accordance claim 2, further comprising opening the second chamber by pivoting, displacing or removing at least a section of one boundary surface of the second chamber and picking the crop from the second chamber.

10. The method in accordance with claim 1, further comprising offsetting the plant relative to the apparatus such that a region of the plant which was initially not located in the second chamber is located in the second chamber after said offsetting.

11. The method in accordance with claim 1, further comprising harvesting a crop from an area of the plant which is located in the second chamber after said displacing.

12. The method in accordance with claim 1, wherein the plant contains a crop in the second chamber, the second chamber having a first side wall and an oppositely disposed second side wall, wherein the method further comprises opening the second chamber by pivoting, displacing, or removing opposing sections of the two oppositely disposed side walls of the second chamber to create a first opening and a second oppositely disposed opening, driving a plate or a shovel from the first opening through the second chamber into the crop, and pressing the crop out of the second opening.

13. The method in accordance with claim 1, wherein humidified air is presented into the second chamber.

14. The method in accordance with claim 9, wherein the opening involves pivoting, displacing or removing sections of two oppositely disposed side walls of the second chamber to form two oppositely disposed openings.

15. The method in accordance with claim 14, further comprising accessing the crop from one of the two oppositely disposed openings and pushing the crop out the other oppositely disposed opening.

16. The method in accordance with claim 15, wherein a plate or a shovel is used to used to push out the crop.

* * * * *

UNITED STATES PATENT AND TRADEMARK OFFICE
CERTIFICATE OF CORRECTION

PATENT NO. : 8,887,439 B2  
APPLICATION NO. : 13/288134  
DATED : November 18, 2014  
INVENTOR(S) : Kamal Daas et al.

Page 1 of 1

It is certified that error appears in the above-identified patent and that said Letters Patent is hereby corrected as shown below:

On the title page at Item "(73) Assignee":
Change "Horticoop B.V. (NL)" to --Horticoop B.V. (NL); Kamal Daas; and Talal Daas--

Signed and Sealed this
Seventh Day of April, 2015

Michelle K. Lee
*Director of the United States Patent and Trademark Office*